United States Patent
Mikkelsen et al.

(10) Patent No.: US 7,449,034 B1
(45) Date of Patent: Nov. 11, 2008

(54) CONTINUOUS DEHYDRATION OF ALCOHOL TO ETHER AND WATER USED AS FUEL FOR DIESEL ENGINES

(75) Inventors: Svend-Erik Mikkelsen, Vaerlose (DK); Peter Lehrmann, Birkerød (DK); John Bøgild Hansen, Copenhagen (DK)

(73) Assignee: Haldor Topsoe A/S, Lyngby (DK)

(*) Notice: Subject to any disclaimer, the term of this patent is extended or adjusted under 35 U.S.C. 154(b) by 358 days.

(21) Appl. No.: 10/019,485

(22) PCT Filed: Jun. 7, 2000

(86) PCT No.: PCT/EP00/05275

§ 371 (c)(1),
(2), (4) Date: Apr. 17, 2002

(87) PCT Pub. No.: WO01/02515

PCT Pub. Date: Jan. 11, 2001

(51) Int. Cl.
*C10L 1/18* (2006.01)

(52) U.S. Cl. .............. 44/302; 44/446; 44/448; 44/451; 431/2; 431/356; 123/25 E; 123/1 A

(58) Field of Classification Search .............. 44/448, 44/302, 451, 446; 431/2, 356; 123/25 E, 123/1 A See application file for complete search history.

(56) References Cited

U.S. PATENT DOCUMENTS

| 4,422,412 A | 12/1983 | Norton |
| 4,876,989 A * | 10/1989 | Karpuk et al. ............ 123/3 |
| 5,440,880 A * | 8/1995 | Ceynow et al. ........... 60/605.2 |
| 5,906,664 A | 5/1999 | Basu et al. |
| 6,125,801 A * | 10/2000 | Mendler ................ 123/48 R |
| 6,270,541 B1 * | 8/2001 | Basu et al. ................ 44/448 |

FOREIGN PATENT DOCUMENTS

| EP | 0431357 | 6/1991 |
| GB | 1593852 | 7/1981 |
| JP | 50-106027 | 8/1975 |
| JP | 56-132447 | 10/1981 |
| JP | 06-249089 | 9/1994 |
| WO | WO 91/07579 | 5/1991 |
| WO | WO 96/05274 | 2/1996 |

OTHER PUBLICATIONS www.fordvehicles.com/help/glossary/index.asp?letter=e 2006.*

* cited by examiner

*Primary Examiner*—Cephia D Toomer
(74) *Attorney, Agent, or Firm*—Dickstein Shapiro LLP

(57) ABSTRACT

The present invention relates to an oxygenated fuel composition suitable for use in compression ignition internal combustion engines, equipped with inlet air heater and catalytic alcohol dehydration equipment suitable for chemical equilibrium conversion of methanol and higher alcohol to their associated ether plus water.

6 Claims, 2 Drawing Sheets

① Two liquid phases

② HTAS/Amoco Patented

On Board MeOH to DME conversion :

③ Equilibrium 200°C, 20 bar
④ Equilibrium 300°C, 20 bar
⑤ Equilibrium 400°C, 20 bar
⑥ Test Fuel # 3
⑦ Test Fuel # 4
⑧ Test Fuel # 6

Ⓐ - MeOH Dehydration Fuel (Dry)
Ⓑ - MeOH Dehydration Fuel (Aqueous)

CONTINUOUS DEHYDRATION OF ALCOHOL TO ETHER AND WATER USED AS FUEL FOR DIESEL ENGINES

FIELD OF INVENTION

This invention relates to improved fuels for compression ignition internal combustion engines equipped with inlet air heater. More particular, this invention relates to oxygenated diesel fuel compositions, which contain a combination of alcohol, ether and water. The ratio of alcohol/ether/water is selected by catalytic dehydration of alcohol. The fuel compositions are obtained by means of a catalytic dehydration unit by which a catalytic dehydration unit by which heat is provided by the engine exhaust provides heat by the engine exhaust. The obtained advantages are low emissions and high engine efficiency.

BACKGROUND OF THE INVENTION

Since Rudolf Diesel invented the basic diesel engine concept in 1893 constant improvements have been reached. The engine efficiency has increased from 5 to more than 40% today. Through decades of continues development work and efforts, reliability, drive ability and performance of this engine type have resulted in global acceptance and huge mass production. The number of diesel engines employed in vehicles, ships and power stations world wide have established a need for constant increased supply of fuel despite of all the above mentioned obtained engine improvements. The good fuel economy is one of the most important reasons for the achieved success measured as number of engines produced and sold compared to the diesel engines counterpart the spark ignition engine or Otto-cycle engine. Depending on engine size, fuel economy in diesel engines today is in the area of 20-40% more efficient than Otto-engines. Associated with the more and more wide spread use of internal combustion engines operated on fossil fuel, ecological and environmentally problems have aroused. Concerns for human health and global environmental changes due to the gases and solid particular matter associated with fuel combustion are of increasing international attention and concern. More specific, the amount of particulate matter, oxides of nitrogen and sulphur, is a problem for even modern diesel engines. Non-combusted fuel and carbon monoxide pose another negative environmental and human influence. To reduce those harmful emissions, improvements of various areas are under constant development. Among these main areas are: fuel injection systems, combustion chamber designs, turbocharger design, heat management systems like internal gas coolers, exhaust gas recycle, etc. Externally catalyst for various applications, absorber systems and particulate trap devises are used and improved. The quality of the diesel fuel is another way to improve combustion and reduce emissions. Better exhaust quality is obtained, to mention some, by desulphurisation, hydrogenation and by controlling fuel distillation properties at the refining process.

In spite of all the achieved improvements, the overall air quality still poses a huge problem on earth due to the number of vehicles running. The present fuel consumption and steady increase causes still more concerns for lack of sustainability for future energy supply. There are obviously three main problems to attend to:

Future energy supply security

Air quality in urban areas (toxic components)

Global air changes (greenhouse gases)

Carbondioxide is a greenhouse gas believed to increase global atmospheric temperature. Limitations of the amount of carbondioxide produced and emitted associated with combustion in internal combustion engines are closely linked to the efficiency of the engine. Generally speaking, diesel engines operate with 30% better fuel efficiency compared to spark assisted Otto-engines. The 30% better fuel efficiency corresponds roughly to 30% less emitted carbondioxide. Natural gas and methanol are both Otto-engine fuels. In the above description a method to improve efficiency for methanol combustion in internal combustion engines by reformulation on board a vehicle, gaining diesel efficiency is outlined.

Generating methanol from natural gas is today an established technology worldwide. More than 25 MMT is produced annually. The methanol production capacity has increased every year for more than a decade now. Known reserves of natural gas recourses, relevant for further production and expansion counts for at least an equivalent energy mass compared to proven oil reserves. While oil and oil deviated fossil fuels are the main source of energy used for transportation today, natural gas and natural gas deviated products counts for a limited use, directly as compressed natural gas (CNG) and liquefied natural gas (LNG) or indirectly in forms of and liquefied deviated products like methanol, ether and Fischer Trops (FT) type products. One of the possible strategies for energy production is more efficient use of the recourses. Another coherent possibility is to change the ratio between oil and gas deviated products used towards the gas technologies. A change in the direction of more efficient utilisation of natural gas based processes combined with more efficient utilisation of the generated fuels used in the transportation sector is a key issue in the present invention. Increasing efficiency could be achieved by increasing production capacity of new industrial production plants (economy of scale) as an example. This combined with development of high efficient use of the produced deviates makes the overall efficiency increase possible. More specifically methanol is today used as a fuel in Otto-engines directly or mixed with gasoline neat or chemically reacted as MTBE as octane improves. In all cases the fuels are suited for Otto engines and used in Otto engines. If the produced fuel could be used directly or indirectly in a diesel cycle engine, increased fuel efficiency of 20-40% would be expected. Many ways have been suggested to achieve this.

To mention one close related way, it has been suggested to convert methanol to dimethylether (DME) and use this as a diesel fuel (U.S. Pat. No. 5,906,664). DME can also be produced in a direct process (Topsoe patent DK 171, 707) and save both investments in plant construction and also in operating costs. DME has shown to be a superior diesel fuel with good combustion characteristic. No particulate is formed and lower emissions of NOx are achieved with no penalty in fuel efficiency. Fuel efficiency is corresponding to diesel fuel based upon energy equivalent mass. However, infrastructure and logistic are more expensive than traditional requirements for gasoline and diesel.

In order to achieve the good efficiency of DME and to avoid the more expensive logistic, methanol is produced, distributed and used as the basic energy carrier. Then methanol is converted on board a vehicle to DME. Methanol conversion is performed by means of a catalytic converter. Catalyst used for the dehydration process is known and applied for in the aerosol industry. The catalytic converter is heated by surplus heat from the exhaust gas using a heat exchanger. The obtained fuel is suitable as fuel for direct and indirect diesel injection engines provided with a heater on the air intake.

Storing a small amount of the generated fuel makes instant engine start possible. Further advantages using the generated fuel composition are the CO-produced water. This water reduces formation of oxides of nitrogen (NOx) due to a reduction in combustion temperature to even lower level than operation with neat DME. Small amounts of unconverted methanol, which is present due to thermodynamic reasons, is acting as CO-solvent for the DME/water mixtures securing that only one single phase of stable fuel is obtained with a very low freezing point.

The present invention relates to a method by which the goal of high efficiency and low emissions can be reached by modifying an Otto-fuel with low fuel efficiency to a diesel fuel with high fuel efficiency. More specifically, methanol, which is a fuel for Otto-engine with high Octane number (115) and low Cetane number (5), is converted to preliminarily dimethylether (DME) with low Octane number and high Cetane number (>55) and water by a catalytic dehydration process. The obtained fuel comprises some unconverted methanol, generated ether as the main component and associated water. This fuel composition is used directly as fuel in a diesel engine. The generated dimethylether has a high Cetane number (>55) and is known to be a superior diesel fuel. From two mole of methanol, one mole of DME and one mole of water are formed. The chemical reaction can be written as follows:

Methanol dehydration $2CH_3OH \rightarrow CH_3OCH_3 + H_2O$

Equilibrium limitations prevent a 100% conversion of methanol to DME and water. This means that methanol conversion or dehydration to ether and water always leaves some unconverted methanol unless a separation or distillation process is applied. However, experimental engine test has concluded that separation of the produced fuel is not required. It has been found that only preheating of the inlet air combined with the catalytic dehydration process is necessary to obtain smooth combustion in a diesel engine.

The fuel composition obtained by dehydration of dry methanol then consists of a constant molecular ratio between DME and water, which is 1:1. Expressed as mass ratio, the ratio of DME and water will be 2.56. Depending on methanol dehydration degree the amount of methanol in the DME/water produced will counts for 0 at 100%. 0% at 100% conversion (theoretically) and 100% at zero conversion. This explanation is shown graphically as a trapeze diagram in FIG. 1 attached.

Modern industrial methanol production plants today are equipped with high quality distillation utilities in order to make high quality chemical grade methanol. If a more simple separation is applied, savings in investment and operating can be obtained. A cheaper fuel grade methanol is then obtained. With the trade-off that this crude or technical grade methanol contains some ethanol, higher alcohol and water up to 20 wt %. However, these alcohol are dehydrated as well as methanol is dehydrated yielding good diesel quality property. The chemical reaction for generating diethylether from ethanol can be written as follows:

Ethanol dehydration
$2C_2H_5OH \rightarrow CH_3CH_2OCH_2CH_3 + H_2O$

The formed diethylether has a low self-ignition temperature (160° C.), which is even lower than DME (237° C.). Higher alcohol is dehydrated likewise to ethers and water. The molecular ratio between ether and water formed are always 1:1 increasing molecular weight of the ether increases the weight ratio between the ether and the water. Methanol dehydration results in a mass ratio between formed dimethylether and water corresponding to 2.6. Ethanol dehydration yields a mass ratio of 4.1 between formed diethylether and water. Evaluation of test fuel containing diethylether is given in Table 6 described later. Minor concentrations of higher alcohol are converted to ether according to the above-described chemical equation.

Alcohol dehydration: $2C_nH_{(2n+2)}O \rightarrow C_{2n}H_{(4n+2)} + H_2O$

To evaluate the influence of water, experimental studies have confirmed that very high concentrations can be tolerated on the condition that sufficient high air inlet temperature are available according to the present invention. Typically, water is closely associated with alcohol production. The price for separation of the alcohol from the water in mixtures depends upon the specific production unit. Usually, this separation cost raise exponentially with the demands for purity. A trade-off in this situation with the fuel price, the price for moving around with the fuel containing water and the fuel efficiency obtained in the engine have to be determined in all situations. Generally speaking more water can be accepted produced and used close to the engine.

Detailed results of experimental evaluation on aqueous fuels are given in Table 7 described later.

SUMMERY OF THE INVENTION

The present invention relates to a more sustainable energy supply situation for the transportation sector for the coming decades if used as the invention suggests. Higher overall fuel efficiency is obtained. At the same time, reduced emissions of environmentally harmful components such as particulate matter (PM) and oxides of nitrogen (NOx) are achieved. Also a reduction in carbondioxide ($CO_2$) is obtained. As a consequence of the technological achievements written in the present invention, a ramification of the possible sources for fuel manufacturing are enabled; not only neat methanol produced from natural gas, also methanol produce from coal or renewable like wood can be used. Even use of garbage could be possible. Higher alcohol especially ethanol can be produced from renewable sources and used in blends with methanol. Mixtures containing methanol/ethanol and water are suitable within a specified written limited area. The alcohol mixtures are converted on board a vehicle to the associated ether and water. The obtained fuel compositions are suitable for use in compression ignition internal combustion engines equipped with inlet air heater. Use of diesel in diesel engines is associated with a surplus of heat released during combustion. Exhaust gas temperatures from 200° C. to more than 500° C. are typical depending on the engine load. Most of this energy contained in the exhaust gas is normally wasted as heat loss. In the present invention this energy is used for the evaporation and heating of the alcohol fuel used. Further, the surplus heat is used to preheat the air used for the combustion.

The synergetic combination of fuel and heat management results in the achieved high fuel efficiency and the low concentrations of harmful spices in the tail gas.

Experiments on a small single cylinder Yanmar YDG 3000 diesel engine equipped with external air heating have confirmed the fuel composition ability to ignite without any glove or spark assistance with the specified advantages.

BRIEF DESCRIPTION OF THE DRAWINGS AND FIGURES

Table 1: Energy content in tested fuels.
Table 2: Test fuel compositions.
Table 3: Test fuel No. 1—DME as reference fuel.
Table 4: Test fuel No. 2—Diesel as reference fuel.
Table 5: Test fuel No. 3—DME/methanol/water=60/15/25, wt/wt %.
Table 6: Test fuel No. 4—DME/methanol/water=60/20/20, wt/wt %.
Table 7: Test fuel No. 5—DME/methanol/water/DEE=50/20/20/10, wt/wt %.
Table 8: Test fuel No. 6—DME/methanol/water=48/4/48 wt/wt %.
Table 9: Summary of achieved results.

DESCRIPTION OF THE INVENTION

Figure 2:
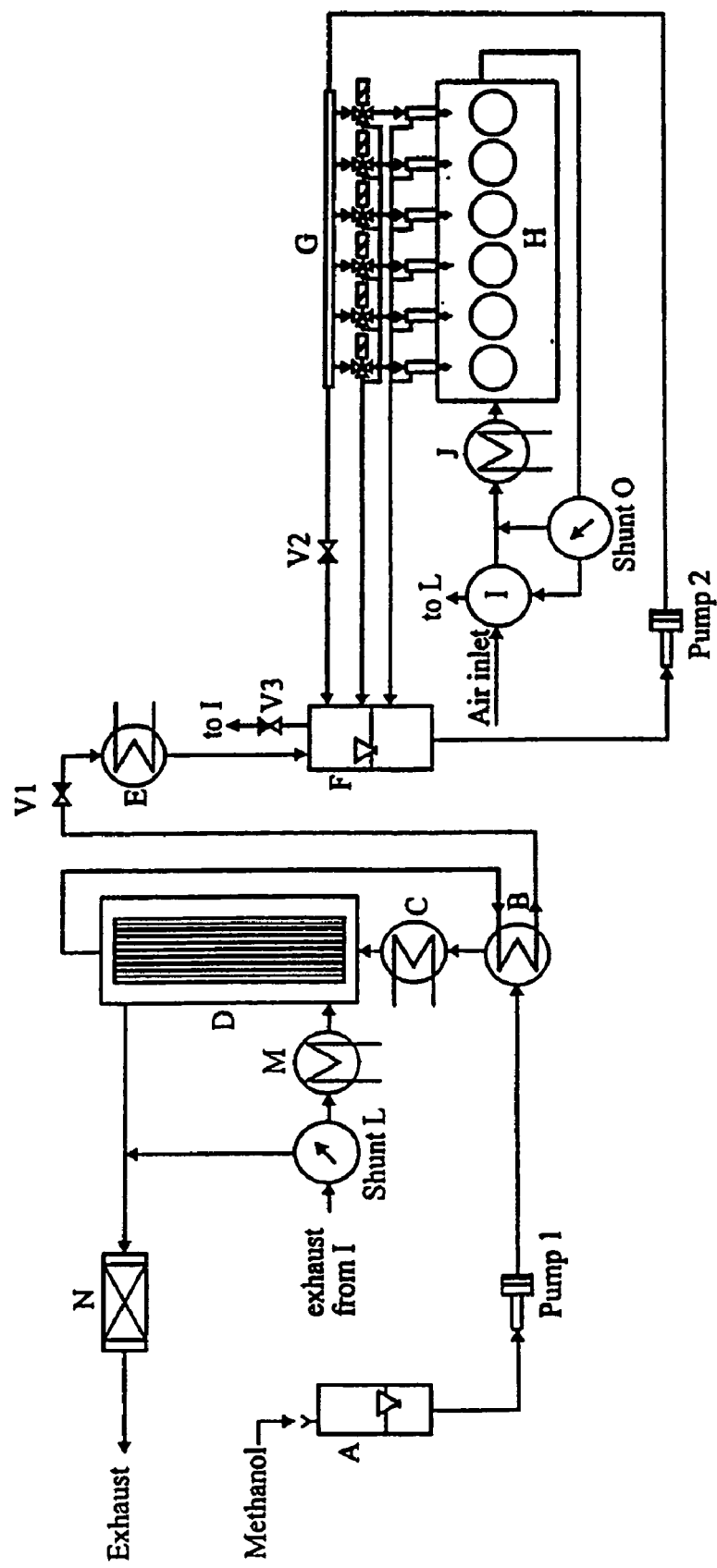
FIG. 2 is a simplified flow sheet for on board alcohol conversion.

The system shown in FIG. 2 consist of a methanol (alcohol) storage tank A. Methanol is pumped by means of pump 1 from the storage tank through B, which is a feed/effluent heat exchanger, where methanol is evaporated and heated. C is a start-up heat exchanger. D is the catalytic dehydration reactor converting the alcohol to ether and water. Reacted methanol leave D through the feed effluent heat exchanger as equilibrated methanol, DME and water. Pressure in the D is adjusted by means of the backpressure valve V1. Through E the fuel is cooled and condensed. In F the fuel is collected. For system start-up, F is supplied with fuel from external source. For normal operation the content in F is sufficient for engine start-up. A level control in F is electronically managing the required fuel production in D. From F the fuel is pumped with pump 2 to the common rail G. The fuel is by electronically controlled injectors injected directly into the cylinders of the engine H. Surplus fuel from the cylinders are returned to F. In order to keep sufficient fuel pressure in G, some surplus fuel is recycled to F through V2, the control valve for system pressure in G. Exhaust air is passed a turbo charger I. Heat from exhaust gas is exchanged and transferred to I into the inlet air used in the diesel engine. J is a separate start up heater. V3 is a back pressure valve connected to I. The dehydration reactor D is heated by exhaust gas from I. Through L, a shunt valve the needed amount of heat is sent to D. Excess heat is sent to the catalytic oxidation catalyst N. C and M is a start up heaters. Exhaust gas passing D is further passed through the catalytic oxidation catalyst N. In N the main part of CO and HC is converted to $CO_2$ and water. From N the stream is led to the open air. Verifying the given description accomplished with detailed experimental documentation a test stand with single cylinder diesel engine and laboratory equipment for preparation fuel mixtures were build. Results are accordingly given below.

Experimental Set-Up

Preparation of Test Fuels

In order to determine the specific ignition quality of the diesel fuel, compositions mentioned a dedicated test engine and associated fuel supply system was set up according to the following description.

Fuel mixtures were prepared in 1 kg batches stored in a 2 liters pressure cylinder. To determine the specific amount of each component, the cylinder was placed on a balance. First DME was added and the scale read out noted. Then a premixed composition of methanol and water was entered another sample cylinder and the amount noted. This mixture was pressurised to 10 bar g with nitrogen. Both cylinders were equipped with valves in top and bottom. The bottom valves of the cylinders were connected by a PTFE hose. By opening both valves, the methanol/water mixture was transferred to the DME containing cylinder driven by the difference in pressure and the valves were closed. The balance read out was noted again. The final composition in wt/wt % was then calculated.

Fuel Supply and Test Engine Set-Up

Now the PTFE hose was connected to a three-way valve inlet position one. Inlet position two was connected to a neat DME supply pressurised by a pump to 18 bar. The outlet of the 3-way valve was then connected to the fuel pump on a single cylinder commercial standard four stroke diesel engine of the type Yanmar model YDG 3000. By changing the direction of the three-way valve toggling between neat liquid DME and test mixture was enabled.

Engine cylinder volume was 0.273 liters. Injector opening pressure was adjusted to 100 bar g and the excess fuel from the injector was recycled to the fuel pump inlet. The 3-way valve was set to position two having neat DME connected to the engine. The engine was now ready for start.

Inlet Air Heater

An external electrical heater on the inlet air powered by external electricity, was build. A thermostat regulator was adjusted to heat, the inlet air to a selected temperature between ambient and 150° C. Thermocouples mounted on the inlet and the outlet exhaust of the engine were connected to a temperature indicator.

Exhaust Gas Analysis

A part stream of the exhaust gas from the engine was pumped through an analytical system. Quantitative on-line determination of carbon monoxide (CO), hydrocarbons (HC), oxides of nitrogen NOx ($NO+NO_2$), carbon dioxide ($CO_2$) and oxygen ($O_2$) were enabled. For the experimental purpose, no catalytic oxidation catalyst was used. This was chosen in order to have the best possible impression of the combustion quality. Equipment measuring the revolutions of the engine was also installed.

Engine Load

Load on the diesel engine was established by connection an electrical heater to the applied 220 Volt electricity generator. A load of 1-2 kW corresponding to 40-80% of nominal maximum capacity was established.

Fuel Consumption

The fuel consumption was determined by logging the read out from the balance carrying the cylinder with the test fuel mixture every minute during the tests. Calculation of the specific fuel consumption was based on the energy content given in Table 1. In the calculations no corrections for the energy used for the external inlet air heating were used. The calculated fuel consumption for the different fuels tested was all performed and compared at the same engine load (1 kW). Below a detailed description of fuel consumption and emissions obtained at various air inlet temperatures given.

TABLE 1

| | Fuel properties | |
| Fuel component | Lower Heating Value MJ/Kg | Molecular weight |
| --- | --- | --- |
| Diesel (MK-1) | 42.5 | — |
| DME | 28.84 | 46.07 |
| DEE | 34.3 | 74.13 |

TABLE 1-continued

Fuel properties

| Fuel component | Lower Heating Value MJ/Kg | Molecular weight |
|---|---|---|
| Methanol | 19.7 | 32.04 |
| Ethanol | 26.8 | 46.07 |
| Water | 0.0 | 18.01 |

Testing of Reference and Diesel Fuel Mixtures

According to Table 2 various test fuels have been prepared to investigate combustion characteristics, exhaust gas compositions and also determine the fuel efficiency.

TABLE 2

Fuel compositions

| Test fuel No. | DME wt % | Methanol wt % | Water wt % | DEE wt % | Diesel wt % |
|---|---|---|---|---|---|
| 1 | >99.5 | 0 | <0.5 | 0 | 0 |
| 2 | 0 | 0 | 0 | 0 | 100 |
| 3 | 60 | 15 | 25 | 0 | 0 |
| 4 | 60 | 20 | 20 | 0 | 0 |
| 5 | 50 | 20 | 20 | 10 | 0 |
| 6 | 48 | 4 | 48 | 0 | 0 |

The procedure for testing these various test fuels is outlined below.

EXAMPLES OF THE INVENTION

Example 1

Neat DME as Reference Fuel (Fuel No. 1)

The engine was started on neat DME. The engine load was adjusted to 1 kW and stabilised. The engine was operated for approximately 5 minutes—until stable exhaust temperature was seen. All measurable parameters as described were measured and noted every minute on a log sheet. Then the inlet temperature of the intake air was heated to 125° C. After stabilisation a new set of measurements was executed. Inlet air heating was cut-off and the engine was stopped.

The results of these two data sets are shown in Table 3. All measured components (NOx, HC, CO, $O_2$, $CO_2$) in the exhaust gas are given as volume amounts. Fuel consumption (FC) are given as actual consumption in g/hour and as calculated values as MJ/hour based on energy content specified as lower heating value (LHV) of the specific fuel tested given in Table 1.

TABLE 3

| Inlet Air temperature ° C. | Exhaust temperature ° C. | FC gram/h | FC MJ/h | NOx PPM | HC PPM | CO % | $O_2$ % | $CO_2$ % |
|---|---|---|---|---|---|---|---|---|
| 10 | 206 | 788 | 22.74 | 119 | 163 | 0.073 | 16.1 | 3.4 |
| 124 | 301 | 756 | 21.80 | 259 | 64 | 0.042 | 14.3 | 4.6 |

Discussion of Results

It was seen that increased inlet temperature increased the fuel efficiency at the specified load. Further, it could be concluded that emissions of HC and Co were reduced with a trade off on the emissions of Nox. NOx emissions were almost doubled as a consequence of the increased inlet temperature.

Example 2

Diesel as Reference Fuel (Fuel No. 2)

In order to compare fuel consumption and emissions diesel fuel was applied as fuel. The Swedish low sulphur fuel type MK-1 was selected for this purpose. The engine was operated without preheated air only. The results are given in Table 4.

TABLE 4

| Inlet Air temperature ° C. | Exhaust temperature ° C. | FC gram/h | FC MJ/h | NOx PPM | HC PPM | CO % | $O_2$ % | $CO_2$ % |
|---|---|---|---|---|---|---|---|---|
| 10 | 204 | 538.8 | 22.63 | 388 | 31 | 0.063 | 15.7 | 3.8 |

Discussion of Results

It appears that the efficiency is almost the same as obtained with neat DME fuel. Emissions of NOx were more than 3 times higher with diesel fuel compared to the DME operation.

Example 3

Diesel Fuel Composition (Fuel No. 3)

DME/methanol/water composition=60/15/25 wt/wt %.

Figure 1:
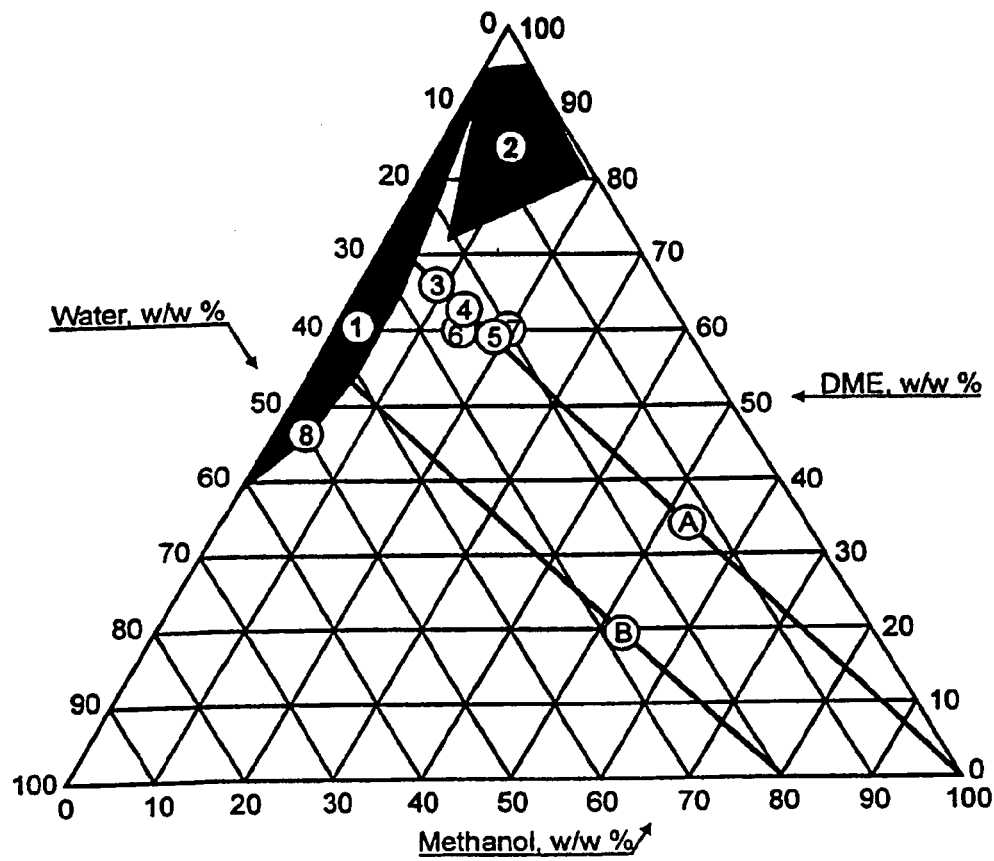
FIG. 1 is a trapeze diagram showing physical conditions for DME, methanol and water, equilibrium conditions, tested fuel compositions and various patented areas.

According to the chemical equilibrium calculations shown in FIG. 1 concentrations close to 60% DME, 15% methanol and 25% water all by mass are obtained at 300° C. dehydration temperature and 20 bar. A fuel mixture having this composition was prepared and tested according to the test procedure described above. The diesel engine was started on neat DME. Load on the engine was set to 40% by means of the electrical heater (1 Kw). Air inlet was heated to 124° C. and stabilised. The 3-way valve was switched from neat DME to fuel No. 3. It was observed that the engine kept running on the specified fuel composition. The fuel consumption and emissions were measured. The air inlet temperature were reduced to 105° C. The engine operation was slightly uneven. Fuel consumption was calculated and emissions measured. Further reduction of air inlet temperature to 80° C. resulted in a definitely more uneven operation. A new data set was assembled.

A failure on the exhaust gas thermocouple occurred during this test. Results are given in Table 5 below.

TABLE 5

| Inlet Air temperature ° C. | Exhaust temperature ° C. | FC gram/h | FC MJ/h | NOx PPM | HC PPM | CO % | $O_2$ % | $CO_2$ % |
|---|---|---|---|---|---|---|---|---|
| 124 | 284 | 1091 | 22.10 | 12 | 184 | 0.020 | 15.0 | 4.4 |
| 105 | n.a. | 1157 | 23.44 | 7 | 270 | 0.25 | 14.1 | 4.5 |
| 80 | n.a. | 1215 | 24.61 | 3 | 486 | 0.32 | 14.2 | 4.3 |

Discussion of Results

The obtained fuel efficiency based on equivalent energy amount was like neat DME at 125° C. inlet temperature. A clear trend was seen when air inlet temperature was reduced. The fuel efficiency was reduced and at the same time CO and HC were increased as a result of the deteriorated combustion. It is seen that NOx values are reduced to a very low level. The actual emission at inlet temperature 125° C. compared to diesel fuel operation at the same conditions was reduced by a factor of 32.

Example 4

Diesel Fuel Composition (Fuel No. 4)

DME/methanol/water composition=60/20/20 wt/wt %.

According to the chemical equilibrium calculations shown in FIG. 1 concentrations close to 60% DME, 20% methanol and 20% water all by mass are obtained at 400° C. dehydration temperature and 20 bar. A fuel mixture having this composition was prepared and tested according to the test procedure described above. The diesel engine was started on neat DME. Load on the engine was set to 40% by means of the electrical heater (1 Kw). Air inlet was heated to 125° C. and stabilised. The 3-way valve was switched to fuel mixture No. 4. It was observed that the engine kept running also on this fuel composition. The combustion was even at the 125° C. inlet temperature. The fuel consumption was not measured in this data series and only $O_2$, $CO_2$ and CO in the exhaust gas were measured. However, the results of combustion behaviour at various inlet temperatures were achieved. Results are given below in Table 6.

The air inlet temperature were reduced to 106° C. The engine operation were uneven and misfiring were observed. Further reduction of air inlet temperature to 77° C. resulted in a definitely more uneven operation and at 60° C. the engine stopped.

TABLE 6

| Inlet Air temperature ° C. | Exhaust temperature ° C. | FC gram/h | FC MJ/h | NOx PPM | HC PPM | CO % | $O_2$ % | $CO_2$ % |
|---|---|---|---|---|---|---|---|---|
| 125 | 341 | n.a. | n.a. | n.a. | 371 | 0.27 | 13.6 | 5.5 |
| 106 | 357 | n.a. | n.a. | n.a. | 701 | 0.31 | 13.6 | 5.6 |
| 77 | 377 | n.a. | n.a. | n.a. | 1705 | 0.33 | 13.1 | 5.8 |
| 60 | Engine stop | | | | | | | |

Discussion of Results

The results indicate that inlet air temperature of 125° C. with this composition is necessary to obtain satisfactory combustion.

Example 5

Diesel Fuel Composition (Fuel No. 5)

DME/methanol/water/DEE composition=50/20/20/10 wt/wt %. According to the chemical equilibrium calculations, concentrations of close to 60% DME plus 20% methanol and 20% water all by mass are obtained at 400° C. dehydration temperature and 20 bar if neat methanol is used as feed for the dehydration reactor. To simulate dehydration at this temperature and to simulate a methanol feed fuel containing ethanol for the dehydration reactor 10% of the DME were replaced by diethylether (DEE), which is the ether formed by dehydration of ethanol. Naturally, a specific composition of a dehydrated product would have a content of unconverted ethanol too. However, the intention of testing this composition were to substantiate the combustion properties of fuel compositions generated from an ethanol containing methanol feed fuel for the dehydration reactor by preparing and testing this fuel No. 5.

A fuel mixture having this composition was prepared, placed on the balance and tested according to the test procedure described above. The diesel engine was again started on neat DME. Load was set to 40% by means of the electrical heater (1 kW). Air inlet was heated to 127° C. and stabilised for 5 minutes. The 3-way valve was switched to fuel mixture No. 5. The engine kept running on the specified fuel composition. Fuel consumption and emissions were recorded at three air inlet temperature levels as listed in Table 7.

TABLE 7

| Inlet Air temperature ° C. | Exhaust temperature ° C. | FC gram/h | FC MJ/h | NOx PPM | HC PPM | CO % | $O_2$ % | $CO_2$ % |
|---|---|---|---|---|---|---|---|---|
| 127 | 337 | 1080 | 23.53 | 10 | 278 | 0.25 | 13.4 | 4.9 |
| 101 | 346 | 1176 | 25.63 | 8 | 513 | 0.29 | 13.3 | 4.9 |
| 70 | 360 | 1275 | 27.78 | 9 | 1000 | 0.31 | 13.1 | 5.0 |

Discussion of Results

According to Table 7 results confirmed earlier observations; very low NOx formation was obtained with these aqueous fuel compositions. Good fuel efficiency at 127° C. was obtained and deteriorated combustion associated with decreased efficiency at lower inlet temperatures.

Example 6

Diesel Fuel Composition (Fuel No. 6)

DME/methanol/water composition=48/4/48 wt/wt %.

The present fuel composition serves as example for the high water tolerance of fuel compositions used in diesel engines with preheated air. A total mapping of all possible fuel compositions is not meaningful. The present fuel composition serves as example of a fuel extremity regarding water content. A more meaningful definition of suitable fuel compositions obtained by dry methanol dehydration and by aqueous methanol dehydration is given in FIG. 1. It appears that fuel compositions obtained having a water content in between the two lines (A and B) are suitable fuels providing a minimum conversion of methanol providing enough ether to start ignition. In the present example, 48% DME were sufficient. However, the lowest acceptable limit of ether content in the fuel composition is associated with the specific engine and the operation conditions for the engine. A fuel mixture having the above-described composition was prepared, placed on the balance and tested according to the test procedure described above. The diesel engine was started on neat DME. Load on the engine was set to 40% by means of the electrical heater (1 kW). Air inlet was heated to 125° C. and stabilised for 5 minutes. The 3-way valve was switched to fuel mixture No. 5. The engine kept running on the specified fuel composition. Fuel consumption and emissions were recorded at three air inlet temperature levels as listed in Table 8.

TABLE 8

| Inlet Air temperature °C. | Exhaust temperature °C. | FC gram/h | FC MJ/h | NOx PPM | HC PPM | CO % | $O_2$ % | $CO_2$ % |
|---|---|---|---|---|---|---|---|---|
| 125 | 250 | 1674 | 24.49 | 7 | 239 | 0.20 | 14.4 | 4.6 |
| 98 | 248 | 1650 | 24.14 | 6 | 365 | 0.32 | 14.4 | 4.3 |
| 78 | 250 | 1920 | 28.09 | 8 | 650 | 0.41 | 14.4 | 4.2 |

Discussion of Results

It can be concluded that the ether ability to ignite even in mixtures with 48% water is satisfactory. However, fuel efficiency is reduced at these very high concentrations. The NOx formation seems to be much suppressed at this low exhaust gas temperature and high partial pressure of water.

TABLE 9

Summery of Achieved Results

| Fuel composition DME/MeOH/$H_2$O/DEE wt/wt % | Air inlet temperature °C. | Fuel Consumption at 40% load MJ/h | NOx PPM | HC PPM | CO % |
|---|---|---|---|---|---|
| Diesel | 10 | 22.63 | 388 | 31 | 0.063 |
| DME | 10 | 22.74 | 119 | 163 | 0.073 |
| DME | 124 | 21.80 | 259 | 64 | 0.042 |
| 60/15/25/0 | 120 | 22.10 | 12 | 184 | 0.20 |
|  | 100 | 23 44 | 7 | 270 | 0.25 |
|  | 80 | 24.60 | 3 | 486 | 0.32 |
| 60/20/20/0 | 125 | — | — | 371 | 0.27 |
|  | 106 | — | — | 701 | 0.31 |
|  | 77 | — | — | 1705 | 0.33 |
| 50/20/20/10 | 127 | 23.53 | 10 | 278 | 0.25 |
|  | 101 | 25.63 | 8 | 513 | 0.29 |
|  | 70 | 27.78 | 9 | 1000 | 0.31 |
| 48/4/48/0 | 125 | 24.49 | 7 | 239 | 0.20 |
|  | 98 | 24.14 | 6 | 365 | 0.32 |
|  | 78 | 28.09 | 8 | 650 | 0.41 |

The invention claimed is:

1. A method of operating a compression ignition engine on an oxygenated diesel fuel composition comprising methanol, dimethyl ether and water, said method comprising the step of injecting the fuel into the combustion chamber of the engine and combusting the fuel with air, wherein the fuel is obtained by dehydrating methanol containing from 0 and up to 20% w/w water by converting 50 to 95% of the methanol to dimethyl ether and water according to the reaction scheme:

$$2CH_3OH \Leftrightarrow DME + water$$

resulting in equilibrium mixtures containing 30 to 68% w/w dimethyl ether, the equilibrium mixtures having at least 5% w/w methanol and at most 50% w/w methanol, and the balance being at least 14% w/w water and at most 40% w/w water;

wherein the dehydrating takes place on board in a vehicle at a temperature between 200° C. and 450° C. and at a pressure between 10 and 400 bar; and wherein the air for combustion is preheated to a temperature of at least 60° C.

2. The method of claim 1, wherein the combustion air is preheated to a temperature of at least 100° C.

3. The method of claim 1, wherein the combustion air is preheated by exchange with exhaust gas.

4. The method of claim 1, applied to vehicles, ships, trains or in stationary diesel engines for power and heat supply.

5. The method of claim 1, wherein the equilibrium mixtures contain 48 to 60% w/w dimethyl ether, the equilibrium mixtures having at least 5% w/w methanol and at most 20% w/w methanol, and the balance being at least 20% w/w water and at most 40% w/w water.

6. The method of claim 1, wherein the methanol contains up to 20% w/w of ethanol or higher alcohols.

* * * * *